(12) United States Patent
Moller et al.

(10) Patent No.: US 9,628,782 B2
(45) Date of Patent: Apr. 18, 2017

(54) BANDWIDTH IMPROVEMENT FOR 3D DISPLAY

(71) Applicant: SETRED AS, Oslo (NO)

(72) Inventors: Christian Moller, Oslo (NO); Doug Patterson, Herts (GB); Thomas Ericson, Bromma (SE)

(73) Assignee: SETRED AS, Oslow (NO)

( * ) Notice: Subject to any disclaimer, the term of this patent is extended or adjusted under 35 U.S.C. 154(b) by 0 days.

(21) Appl. No.: 14/291,299

(22) Filed: May 30, 2014

(65) Prior Publication Data
US 2015/0002645 A1 Jan. 1, 2015

Related U.S. Application Data

(63) Continuation of application No. 12/297,581, filed as application No. PCT/GB2007/001406 on Apr. 19, 2007, now abandoned.

(30) Foreign Application Priority Data

Apr. 19, 2006 (GB) .................................. 0607726.7
Apr. 19, 2006 (GB) .................................. 0607727.5

(51) Int. Cl.
H04N 13/04 (2006.01)

(52) U.S. Cl.
CPC ..... *H04N 13/0413* (2013.01); *H04N 13/0402* (2013.01); *H04N 13/0404* (2013.01); *H04N 13/0497* (2013.01)

(58) Field of Classification Search
CPC .................................. H04N 13/0413

USPC ............................................ 348/51; 345/147
See application file for complete search history.

(56) References Cited

U.S. PATENT DOCUMENTS

| 4,740,073 A | 4/1988 | Meacham |
| 4,853,769 A | 8/1989 | Kollin |
| 5,132,839 A | 7/1992 | Travis |
| 5,465,175 A | 11/1995 | Woodgate et al. |
| 5,678,089 A | 10/1997 | Bacs et al. |
| 5,699,112 A | 12/1997 | Bacs, Jr. |

(Continued)

FOREIGN PATENT DOCUMENTS

| CN | 1269103 | 10/2000 |
| CN | 1573421 | 2/2005 |

(Continued)

OTHER PUBLICATIONS

Stereographics® Developers' Handbook; Background on Creating Imags for CrystalEyes® and SimulEyes®; © 1997 StereoGraphics Corporation; 66 pages.

(Continued)

*Primary Examiner* — Yulin Sun
(74) *Attorney, Agent, or Firm* — DLA Piper LLP (US); Gianni Minutoli

(57) ABSTRACT

A method of operating an autostereoscopic display, the autostereoscopic display device comprising a switchable aperture array and a screen, the method comprising: displaying a portion of an image on the screen for a first period of time; and using the switchable aperture array to restrict to a second period of time the time for which a portion of the image is wholly or partly visible; wherein the second period of time is less than the first period of time in order to increase the bandwidth of the autostereoscopic display.

15 Claims, 10 Drawing Sheets

(56) References Cited

U.S. PATENT DOCUMENTS

| | | | |
|---|---|---|---|
| 5,825,541 A | 10/1998 | Imai | |
| 5,875,055 A | 2/1999 | Morishima et al. | |
| 5,880,704 A | 3/1999 | Takezaki | |
| 5,986,640 A * | 11/1999 | Baldwin et al. | 345/596 |
| 5,991,551 A | 11/1999 | Bacs et al. | |
| 6,014,164 A | 1/2000 | Woodgate et al. | |
| 6,128,132 A | 10/2000 | Wieland et al. | |
| 6,172,807 B1 | 1/2001 | Akamatsu | |
| 6,324,347 B1 | 11/2001 | Bacs, Jr. et al. | |
| 6,366,281 B1 | 4/2002 | Lipton et al. | |
| 6,377,295 B1 | 4/2002 | Woodgate et al. | |
| 6,674,463 B1 * | 1/2004 | Just et al. | 348/43 |
| 6,712,471 B1 | 3/2004 | Travis et al. | |
| 6,795,241 B1 | 9/2004 | Holzbach | |
| 6,927,886 B2 | 8/2005 | Plesniak et al. | |
| 6,970,290 B1 | 11/2005 | Mashitani et al. | |
| 7,023,466 B2 | 4/2006 | Favalora et al. | |
| 7,043,073 B1 | 5/2006 | Holzbach | |
| 7,046,271 B2 | 5/2006 | Doerfel et al. | |
| 7,573,491 B2 | 8/2009 | Hartkop et al. | |
| 7,633,528 B2 | 12/2009 | Fukushima et al. | |
| 7,652,665 B2 | 1/2010 | Fukushima et al. | |
| 8,179,424 B2 | 5/2012 | Moller | |
| 2001/0045951 A1 | 11/2001 | Allen | |
| 2002/0036648 A1 | 3/2002 | Putilin | |
| 2002/0063807 A1 | 5/2002 | Margulis | |
| 2003/0076558 A1 | 4/2003 | Raman et al. | |
| 2003/0128871 A1 | 7/2003 | Naske et al. | |
| 2004/0057111 A1 | 3/2004 | Dominguez Motntes | |
| 2004/0070556 A1 | 4/2004 | Weitbruch et al. | |
| 2005/0099688 A1 | 5/2005 | Uehara et al. | |
| 2006/0012878 A1 | 1/2006 | Lipton et al. | |
| 2006/0233446 A1 | 10/2006 | Saito et al. | |
| 2006/0262376 A1 | 11/2006 | Mather et al. | |
| 2008/0018732 A1 | 1/2008 | Moller | |
| 2010/0026795 A1 | 2/2010 | Moller et al. | |
| 2011/0109629 A1 | 5/2011 | Ericson et al. | |

FOREIGN PATENT DOCUMENTS

| | | |
|---|---|---|
| EP | 0 541 374 | 5/1993 |
| EP | 0 625 861 A2 | 11/1994 |
| EP | 0 804 042 A2 | 10/1997 |
| EP | 0 847 208 | 6/1998 |
| EP | 0 860 728 | 8/1998 |
| EP | 1 089 573 A2 | 4/2001 |
| EP | 1 401 216 | 3/2004 |
| EP | 1489858 | 12/2004 |
| GB | 2 206 763 | 1/1989 |
| GB | 2 405 043 | 2/2005 |
| GB | 2 405 517 | 3/2005 |
| GB | 2 405 542 A | 3/2005 |
| GB | 2 406 730 | 4/2005 |
| GB | 2 406 731 A | 4/2005 |
| GB | 2 48 344 | 1/2007 |
| JP | 58199321 | 11/1983 |
| JP | 62153833 | 7/1987 |
| JP | 03119889 | 5/1991 |
| JP | 09171156 | 6/1997 |
| JP | 10322726 | 12/1998 |
| JP | H 10-322726 | 12/1998 |
| WO | WO 98/43441 | 10/1998 |
| WO | WO 99/00993 | 1/1999 |
| WO | WO 03/054797 | 7/2003 |
| WO | WO 03/090479 A1 | 10/2003 |
| WO | WO 2005/027534 A2 | 3/2005 |
| WO | WO 2005/106572 | 11/2005 |
| WO | WO 2005/112474 | 11/2005 |

OTHER PUBLICATIONS

Chinese 3$^{rd}$ Office Action for Chinese Application No. 201110081768.2 dated Apr. 2, 2013.

International Search Report for International Application No. PCT/IB2005/001480 dated Dec. 21, 2005.

International Search Report for International Application No. PCT/GB2007/001407 dated Jul. 17, 2007.

International Search Report for International Application No. PCT/GB2008/002933 dated Jan. 19, 2009.

Application and File History for U.S. Appl. No. 11/569,048, filed May 8, 20078, inventor Moller.

Application and File History for U.S. Appl. No. 12/297,590, filed Feb. 4, 2009, inventors Moller et al.

Application and File History for U.S. Appl. No. 12/675,937, filed Jan. 24, 2011, inventors Ericson et al.

Application and File History for U.S. Appl. No. 12/297,581, filed Jan. 30, 2009, inventors Moller et al.

Partial European Search Report for European Application No. 11194100.1, dated Dec. 16, 2014.

* cited by examiner

BANDWIDTH IMPROVEMENT FOR 3D DISPLAY

RELATED APPLICATIONS

The present application is continuation of application Ser. No. 12/297,581 filed Jan. 30, 2009, which is a National Phase entry of PCT Application No. PCT/GB2007/001406, filed Apr. 19, 2007, which claims priority from GB Application No. 0607726.7, filed Apr. 19, 2006, and GB Application No. 0607727.5, filed Apr. 19, 2006, the disclosures of which are hereby incorporated by reference herein in their entirety.

FIELD OF THE INVENTION

The present invention relates to an autostereoscopic display apparatus. The present invention also relates to a method of operating an autostereoscopic display.

BACKGROUND

A well proven method for creating a 3D image is to cause a viewer to see different perspective views of a scene with each eye. One way to do this is to display two differently polarized images on a screen, and for the viewer to wear corresponding polarizing filters on each eye.

An autostereoscopic display or a three dimensional (3D) display may be implemented using an aperture or slit array in conjunction with a two dimensional (2D) display to display a 3D image. The principle of the device is that when looking at a 2D image through a slit array, the slit array separated from the screen by a distance, then the viewer sees a different part of the 2D image with each eye. If an appropriate image is rendered and displayed on the 2D display, then a different perspective image can be displayed to each eye of the viewer without necessitating them to wear filters over each eye.

One important parameter which governs quality in most 3D display technology, is bandwidth, defined as the amount of data presented by a 3D display. To achieve large depth with high resolution over a wide viewing area, a large bandwidth is usually required.

Embodiments of the invention demonstrate ways in which bandwidth limitations of autostereoscopic display apparatus may be overcome in order that high resolution 3D images may be displayed.

The invention disclosed herein may be implemented in the scanning slit time-multiplexed system described in PCT application PCT/IB2005/001480. However, the invention may also be used in conjunction with other display systems.

The scanning slit system creates the 3D effect by showing different pictures to different locations in front of the display at high speed. It achieves this by combining a high frame rate 2D display with a shutter. The shutter is synchronised with the display and ensures that different portions of the 2D display are visible only from specific locations. The left image in FIG. 1 shows how a viewer looking through a narrow slit will see two distinct regions, one for each eye. To create a 3D display from this simple slit system, the slit must shift laterally sufficiently quickly so that a viewer sees the scanning shutter as a transparent window. If all the slits are updated quickly enough to be perceived as flicker-free, a viewer will see the full resolution of the underlying 2D display from any position. The 2D display shows different images synchronised with the opening of slits in the shutter, as shown in the right image in FIG. 1.

SUMMARY

Embodiments of the invention are directed towards the field of improving the bandwidth of an autostereoscopic display. Bandwidth may be considered as the amount of image information that can be displayed by the autostereoscopic display over a defined period of time. An autostereoscopic display may be used to display animated 3D images, or 3D video. The 3D animation may be computer generated, in this way perspective views for each frame of the animation may be readily rendered from basic 3D data associated with the animated scene.

Smooth animation is perceived by a viewer if there are at least 24 frames per second. However, if the screen is refreshed at this rate, then the viewer will perceive flicker. This is overcome by refreshing the image displayed on the screen at a higher screen refresh rate than the animation rate. For example, cinema projection shows each animation frame twice, resulting in a screen refresh rate of 48 times per second.

An autostereoscopic display apparatus uses a switchable aperture array or shutter array. The switchable aperture array is an array of switchable slits. The switchable apertures may be electro-optical and may use Liquid Crystals. In principle, a first switchable aperture of the array is opened and a correctly rendered image is displayed behind it. The viewer thus sees different parts of the image with each eye, each part being a portion of a different perspective view. The first switchable aperture is closed and then a second switchable aperture is opened and the process repeats. In practice, more than one aperture is opened at a time. A plurality of apertures, each spatially separated from the other is opened at the same time, and an appropriate image portion displayed on the screen area behind each. The 2D image displayed on the screen while an aperture or a group of apertures is open is a subframe. The minimum number of groups of apertures is determined by the desired 3D image quality. The number of groups of apertures determines the number of subframes that must be displayed during a display refresh time.

Continuing with the example from cinema projection, where the display refresh time is $1/48^{th}$ of a second. If there are 8 groups of apertures, then 8 subframes are displayed per refresh frame. This requires a subframe display time of $1/384^{th}$ of a second, or about 2.6 ms.

A time multiplexed display, such as a Digital Micromirror Device (DMD), can be used in the 2D display. A DMD typically uses a fixed intensity light source, and controls the amount of time that each pixel in a frame is illuminated. This period of time is interpreted by the viewer as a brightness, the longer the pixel is illuminated the brighter the pixel is perceived to be. A time multiplexed display has a minimum period of time that a pixel may be illuminated on a screen. This provides a limit as to the bit depth of the image that may be displayed on the screen and in turn on the autostereoscopic display.

According to an aspect of the present invention, there is provided a method of operating an autostereoscopic display, the autostereoscopic display device comprising a switchable aperture array and a screen, the method comprising: displaying a portion of an image on the screen for a first period of time; and using the switchable aperture array to restrict to a second period of time the time for which a portion of the image is wholly or partly visible; wherein the second period of time is less than the first period of time.

The first period of time may be a minimum time period for display of a pixel on the screen. The screen may be time multiplexed using a light source of constant intensity. The screen may be time multiplexed and display pixels of constant intensity.

There will be a group of pixels for which the same aperture restricts the image that is visible. For a time multiplexed screen the image elements (bits) may be arranged in the same order for all pixels in the group such that the aperture restricts the same image elements for all the pixels.

A particular aperture will restrict the time that an area of the screen is visible. The area of the screen comprises a particular set of pixels. For a time multiplexed screen the time components (or bits) of each pixel may be arranged in the same order of magnitude for all pixels in the particular set of pixels such that the aperture performs the desired amount of restriction for all pixels of the particular set of pixels. Further, for a time multiplexed screen each pixel of the particular set of pixels must be coordinated such that when the aperture closes, it clips all pixels at the appropriate time.

According to an aspect of the present invention, there is provided a method of operating an autostereoscopic display, the autostereoscopic display device comprising a switchable aperture array and a screen, the method comprising: using the switchable aperture array to restrict a period of time that an image shown on the screen is visible to a viewer.

According to an aspect of the present invention, there is provided a method of operating an autostereoscopic display, the autostereoscopic display device comprising a switchable aperture array and a screen, the method comprising: using the switchable aperture array to reduce the intensity of the image visible to a viewer.

The extent to which the switchable aperture array reduces the period of time that an image shown on the screen is visible to a viewer may be varied. The length of time by which the switchable aperture array reduces the period of time that an image shown on the screen is visible to a viewer may be varied. This length of time may be varied in discrete amounts to define greyscale levels of image brightness.

According to an aspect of the present invention, there is provided a method of operating an autostereoscopic display, the autostereoscopic display device comprising a switchable aperture array and a screen, wherein the screen has a minimum image display time, the method comprising: using the switchable aperture array to reduce the amount of time that an image displayed on the screen is visible below the minimum image display time.

According to an aspect of the present invention, there is provided a method of operating an autostereoscopic display, the autostereoscopic display device comprising a switchable aperture array and a screen, the method comprising: displaying a particular frame of a scene on the screen for a first period of time; and using the switchable aperture array to allow a portion of the screen to be visible to a viewer for a second period of time; wherein: the second period of time begins before the first period of time; or the second period of time ends after the first period of time; such that for a portion of the second period of time a frame either immediately preceding or immediately following the particular frame is visible on the portion of the screen.

According to an aspect of the present invention, there is provided a method of operating a time multiplexed autostereoscopic display, the autostereoscopic display device comprising a switchable aperture array and a screen, the screen having variable output brightness, the method comprising: displaying bright portions of a frame when the screen is at a full brightness and then displaying less bright portions of the frame when the screen is at a reduced brightness.

The bright portions of the frame and the less bright portions of the frame may be displayed in non-adjacent periods of time. The switchable aperture array may be synchronised such that a set of apertures is open when the bright portions of the frame and the less bright portions of the frame are displayed. The switchable aperture array may be synchronised such that a set of apertures is closed between the times when the bright portions of the frame and the less bright portions of the frame are displayed. The bright portions of all subframes of a three dimensional image may be displayed adjacent in time. The less bright portions of all subframes of a three dimensional image may be displayed adjacent in time.

The bright portions of a frame may be the most significant bits (MSBs) of an image. The less bright portions of a frame may be the least significant bits (LSBs) of an image. There may be more than one level of bright portions and more than one level of less bright portions that may all be displayed with different levels of brightness.

According to an aspect of the present invention, there is provided a method of operating a time multiplexed autostereoscopic display, the autostereoscopic display device comprising a switchable aperture array and a screen, the screen having variable output brightness, the method comprising: displaying first brightness portions of a frame when the screen is at a first brightness and then displaying second brightness portions of the frame when the screen is at a second brightness. The method may further comprise displaying one or more sets of additional brightness portions of a frame when the screen is at one or more additional brightnesses. The first, second and additional brightness levels may be different.

The brightness of the screen may be reduced by reducing the power input into a light source. The brightness of the screen may be reduced by applying a filter between the light source and the screen. The screen may be arranged to display different colours sequentially. Colour filters may be applied between the light source and the screen to allow different colours to be displayed on the screen. The colour filters may take the form of a colour wheel. Intensity filters may be used in conjunction with colour filters to sequentially display bright portions and less bright portions of each colour component of an image.

The screen may display different colour components of an image concurrently. Intensity filters may be used to display the bright portions of an image and the less bright portions of an image consecutively.

According to an aspect of the present invention, there is provided a method of operating an autostereoscopic display, the autostereoscopic display device comprising a switchable aperture array and a screen, the method comprising: splitting a frame into a plurality of subframes. Each subframe represents a different portion of the frame. Each subframe may be different. The switchable aperture array is synchronised such that a plurality of apertures are open for each subframe. The subframes are shown in succession at a fast rate such that a viewer perceives the sum of the plurality of subframes to be the same image as the original frame. The viewer perceives the sum of the plurality of subframes due to persistence of vision, if the rate of display of sequential subframes is sufficiently fast.

More than one subframe may be displayed for a particular group of opened apertures. A first subframe contains the LSBs and a second subframe does not contain the LSBs. Alternatively, a first selection of pixels in the first subframe may contain the LSBs and a second selection of pixels in the second subframe may contain the LSBs, the second selection of pixels being the inverse selection of the first selection of pixels. The first selection of pixels may comprise every other pixel of the screen, in a chess board pattern. The pixel selection may be a high frequency pattern where one subframe contains the pattern and one subframe contains the inverse of the pattern.

A first aperture is closed and a second aperture is opened at substantially the same time, this time is the switching time. The switching time may be at the start of, or end of, or during, a shared time space. The shared time space is a time period between the first and second time periods.

The switchable aperture array may switch between a transparent state and an opaque state during a shared time space. The area of screen displaying a first portion of an image for a first time period is used to display a second portion of an image for a second time period. The shared time space is a time period between the first and second time periods. A first aperture is closed and a second aperture is opened at substantially the same time, this time is the switching time. The switching time may be at the beginning, during, or at the end of the shared time.

The first and second portions of an image are adjacent in time. Accordingly, the first and second portions of an image share the same time space for display of the lowest order bits of each image. Alternatively, the shared time space is used alternately between the first and second shutters.

According to an aspect of the present invention, there is provided a method of operating an autostereoscopic display apparatus comprising a first and second projector, each projector using light of a different polarization, a screen which maintains the polarization of light, a first polarizing shutter and a second polarizing shutter, the method comprising selectively switching the polarization state of the first and second polarizing shutters to selectively display an image from one projector on a particular portion of the screen to a viewer.

According to an aspect of the present invention, there is provided an autostereoscopic display apparatus comprising:
a first and second projector, each projector using light of a different polarization,
a screen which maintains the polarization of light,
a first polarizing shutter and
a second polarizing shutter,
wherein the polarization state of the first and second polarizing shutters is selectively switched to selectively display an image from one projector on a particular portion of the screen to a viewer.

According to an aspect of the present invention, there is provided an autostereoscopic display apparatus comprising:
a screen;
a first projector arranged to operate with light polarized in a horizontal direction;
a second projector arrange to operate with light in a vertical direction;
a first switchable polarization array arranged to selectively rotate the polarization of light passing therethrough; and a second switchable polarization array arranged to selectively rotate the polarization of light passing therethrough.

According to an aspect of the present invention, there is provided an autostereoscopic display device comprising a screen and a switchable aperture array, the screen displaying a plurality of images concurrently, each image comprising a different light bundle, and each aperture of the switchable aperture array cooperating with an interference filter. Each interference filter may be arranged to pass the light of one light bundle. Each light bundle may be a set of distinct red, green and blue light frequencies.

According to an aspect of the present invention, there is provided an autostereoscopic display apparatus comprising:
a plurality of 2D image generators, each image generator using light of a different characteristic,
a screen which maintains the characteristic of light from each 2D image generator,
a switchable aperture array, each aperture comprising a filter
wherein the apertures are selectively switched to selectively display an image from a 2D image generator on particular portion of the screen to a viewer.

Each 2D image generator may be a projector. The characteristic of light may be a polarization. The characteristic if light may be a frequency. The characteristic of light may be a light bundle.

Each aperture of the aperture array may have an associated lens. The lens may be placed on the same side of the shutter as the screen, or on the opposite side of the shutter to the screen. Each aperture of the aperture array may have two associated lenses, one on each side of the aperture.

Each aperture of the aperture array may have an associated holographic element. The holographic element may be placed on the same side of the shutter as the screen, or on the opposite side of the shutter to the screen. Each aperture of the aperture array may have two associated holographic elements, one on each side of the aperture.

The screen may comprise an asymmetric optical diffuser. A plurality of images may be projected onto the screen with different angles of incidence such that a different image is viewed on the diffuser dependent on the angle of observation of the diffuser. Different angles of incidence may be achieved using a plurality of projectors. Different angles of incidence may be achieved from a single projector using at least one mirror to create a plurality of optical paths between the projector and the diffuser.

Head tracking apparatus may be used to monitor the position of a viewer, the image displayed by the autostereoscopic display apparatus is then rendered according to the detected position of the user.

The screen may comprise two diffusive elements, a first diffusive element and a second diffusive element, the first diffusive element arranged between the second diffusive element and the aperture array. The first diffusive element is transparent to light from the second diffusive element. The second diffusive element displays background images to provide an increased depth of field for the autostereoscopic display.

The aperture array may comprise black stripes between scanned apertures. For a given number of scanned apertures, black stripes introduced between them results in narrower apertures. The black stripes may be implemented by closing a first set of apertures and only scanning a second set of apertures of a switchable aperture array. This results in improved depth resolution.

The aperture array may comprise average value apertures between scanned apertures. For a given number of scanned apertures, average value apertures introduced between them results in narrower apertures. The average value apertures may be implemented by opening an average value aperture before the end of the period of time that a first adjacent scanned aperture is open, and closing the average value aperture during a period of time that a second adjacent scanned aperture is open. The length of time that the average value aperture is open may have a mid-point in time that is coincident with the time that the second adjacent aperture is opened. The length of time that the average value aperture is open may have a mid-point in time that is coincident with the time that the first adjacent aperture is closed.

The average value apertures may be implemented by opening an average value aperture half way into the period of time that a first adjacent scanned aperture is open, and closing the average value aperture half way into the period of time that a second adjacent scanned aperture is open. The first and second adjacent scanned apertures are on opposite sides of the average value aperture.

According to an aspect of the present invention, there is provided a method of operating an autostereoscopic display, the autostereoscopic display device comprising a switchable aperture array and a screen, the method comprising:

displaying a first frame of a scene on the screen for a first period of time;

opening a first aperture of the switchable aperture array for the first period of time;

displaying a second frame of a scene on the screen for a second period of time;

opening a second aperture of the switchable aperture array for the second period of time;

opening an intermediate aperture during the first period of time; and closing the intermediate aperture during the second period of time, wherein the intermediate aperture is between the first and second apertures.

The autostereoscopic display apparatus displays a three dimensional image as a plurality of subframe. Each subframe is rendered to correspond to at least one open slit in the aperture array. A subframe may comprise a plurality of strips of rendered images, each strip rendered for a particular slit. For each subframe a plurality of spatially separated slits are consecutively opened and a rendered image strip is displayed on the screen behind each open slit. A slit may comprise one or more apertures. The more apertures a slit comprises the wider the slit. A three dimensional image may be displayed by showing a first set of subframes having slits of a first width and a second set of subframes having slits of a second width.

According to an aspect of the present invention, there is provided an autostereoscopic display apparatus comprising a central configuration unit arranged to set, during operation of the apparatus, at least one of the following:

the bit depth of a displayed image;

the range of viewing angles for which viewer experiences continuous parallax;

the apparent depth of the 3D image;

the spatial resolution of the displayed image;

the flicker rate of the displayed image; and the animation rate of the displayed image.

According to an aspect of the present invention, there is provided an autostereoscopic display apparatus comprising:

a switchable aperture array wherein during operation the slit width of a parallax barrier is determined by a number of adjacent apertures opened at the same time;

a screen comprising a 2D image source, the image source capable of displaying a variable frame rate, and a variable pixel bit depth; and an adaptive rendering apparatus arranged to render images for display on the autostereoscopic display apparatus according to the configuration of the autostereoscopic display apparatus.

The autostereoscopic display apparatus has a shutter array. A first and second switchable aperture array may form the shutter array. The shutter array cooperates with a display screen to create a display apparatus. An arrangement may be provided to alter the separation between the display screen and the shutter array to change the characteristics of the display apparatus for different purposes. The arrangement may be a simple electromechanical arrangement comprising motors, worm gears and racks at each corner of the display apparatus.

BRIEF DESCRIPTION OF THE DRAWINGS

Non-limiting embodiments of the present invention will be described by way of example with reference to the accompanying drawings, in which.

DETAILED DESCRIPTION OF THE DRAWINGS

Types of Bandwidth Improvements 3D display systems can be flexible in the sense that bandwidth may be prioritized in different ways depending on application. The overall bandwidth is defined as the total number of addressable pixels and the number of colour bits per addressable pixel. In the time multiplexed system described above bandwidth is the combination of four factors:
1. The XY resolution for a single frame on the underlying display
2. The colour bit depth for each pixel
3. The number of unique frames presented within a full 3D frame
4. The repetition rate for each unique frame For a given bandwidth one may choose to prioritize between points 2 and 3 above. For example, if colour depth is reduced the number of unique frames can increase giving an image with better depth or larger viewing region.

Depending on the 3D data being shown and the audience, one may want to make different trade offs in how the bandwidth is prioritised. Hence, a method of enabling changing this trade off dynamically would be valuable. This may be achieved by adding dynamic control to several parts of the 3D display system. The user may then control settings through a software or other input interface.

Figure 16:
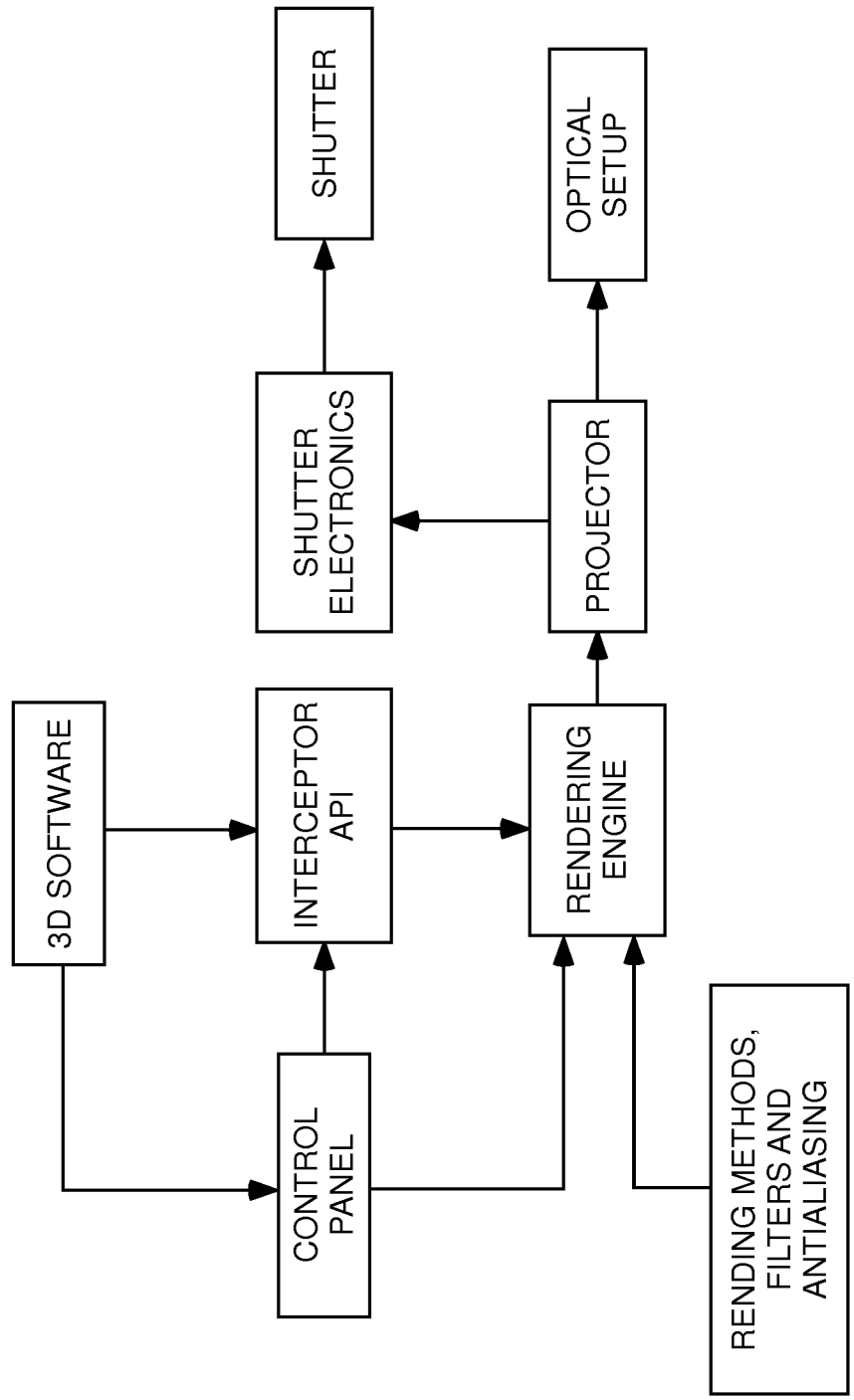
FIG. 16 shows the operation of a central configuration unit.

From a user perspective the main properties that may be changed are:
1. The colour or greyscale bit depth
2. The size or angle of the zone where a viewer experiences continuous parallax
3. The depth quality of the image
4. The XY (horizontal and vertical) spatial resolution
5. The flicker rate
6. The animation rate One way to implement such flexibility is to have a central configuration unit that sends instructions on system settings to the different system components. An example of a block diagram using a control panel as a central configuration unit is shown in FIG. 16. The unit can be a PC that is running the 3D application being used. It can send instructions either through a separate communication channel for changing settings or embedded in existing synchronisation and data transfer channels. The operation will be explained by way of example.

Figure 17:
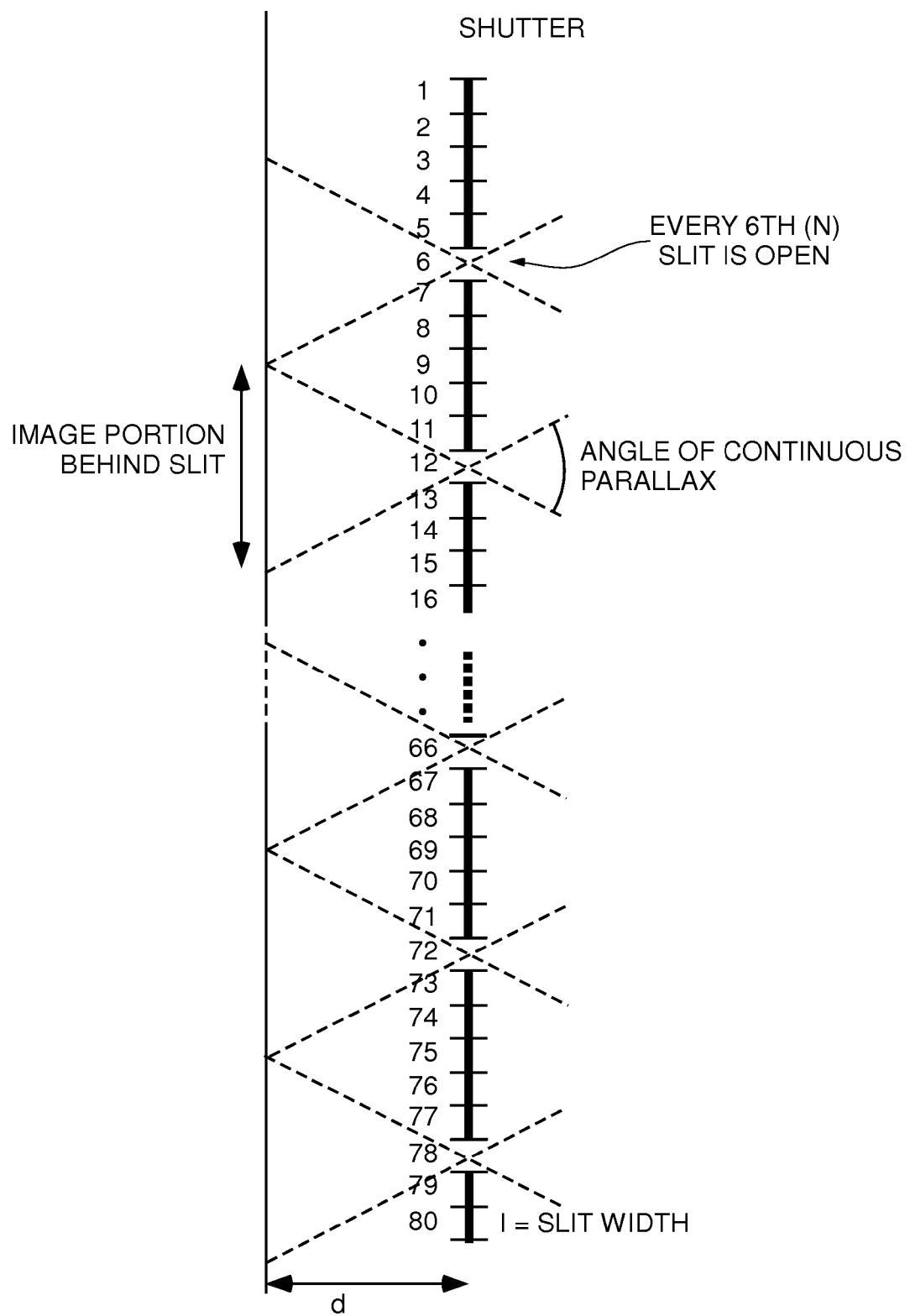
FIG. 17 shows the viewing region where continuous parallax is available.

In a base example the display has 5 bits greyscale bit depth, the angle with continuous parallax for a given slit is 45 degrees and a given depth quality. The setup is shown in FIG. 17. This is a result of a specific setup where:
  d=distance between the shutter and the underlying display plane
  l=width of a slit in the shutter
  N=number of unique frames shown by the underlying display. In this case this also equals the number of slits of slit width l, between simultaneously open slits. In this example it is N=6.

The complexity of the example is limited in order to simplify explanation. N may be significantly larger and the image portion behind an aperture does not be to be centred behind the aperture. Edge effects are not described in detail. Also, the actual angle with continuous parallax experienced by viewers may not be the same as the angle with continuous parallax for a particular slit or aperture.

Figure 18:
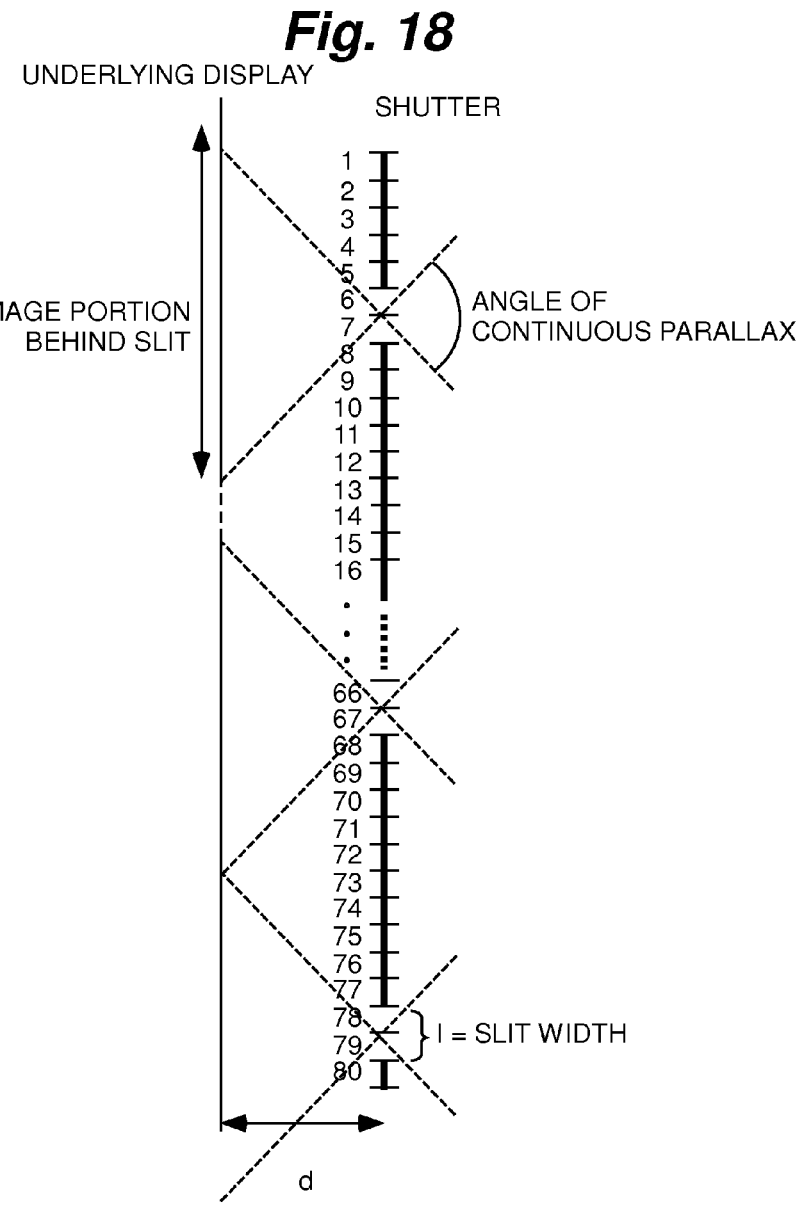
FIG. 18 shows a shutter arrangement where the slit width equals the width of two switchable apertures.

The user decides to increase the size of the zone with continuous parallax to around 80 degrees. However, this cannot be achieved without compromising another property. In a first example, shown in FIG. 18, the depth quality is reduced while the greyscale bit depth is maintained:
1. The central configuration unit stores the input from the user to increase the viewing zone from around 45 to around 80 degrees.
2. Via an I2C channel, or other interface, it sends instructions to the electronics control unit for the shutter. The shutter driving sequence is changed so that two or more adjacent columns are switched simultaneously to give a slit width l, twice the width of what it was in the initial state. Another way to achieve the same effect is to send instruction to a mechanism that reduces the distance d, between the shutter and the underlying display.
3. The underlying display, e.g. a projector, receives the new settings through communication over I2C or other communication channel. It is instructed to maintain the same number of unique frames and the same greyscale bit depth. Because the same number of unique frames are shown over a larger viewing zone the depth quality will be reduced. The underlying display may require new instructions on the size and coordinates of an image portion shown behind a slit.
4. The rendering engine receives the new setting. It changes the coordinates of frustums used in rendering image data and the size of image portions sent to the underlying display. In this example the size of the image portions doubles. It may also use the information to change the rendering method or other filters to optimise the image quality for the specific setting.
5. The software application or other content source receives the new setting. It may for example use this information to include more data in the scene given the higher maximum viewing angle in a scene.

In a second example the viewing zone is increased and greyscale bit depth is reduced in order to maintain the depth quality.
1. The central configuration unit stores the input from the user to increase the viewing zone from around 45 to around 80 degrees and to reduce greyscale bit depth.
2. The underlying display or screen, e.g. a projector, is instructed to change its imaging sequence to reduce bit depth from 5 bits to 4 bits. In this example this allows for the number of unique frames N, to double from 6 to 12. The underlying display may require new instructions on the size and coordinates of an image portion shown behind a slit.
3. Instructions are sent to the electronics control unit for the shutter. The shutter driving sequence is changed so that instead of having 6 groups of slits that are synchronised with display frames there are 12 groups of slits that are synchronised with display frames. The time that a slit is open is reduced to half to be the same duration as a frame in the underlying display. The slit width l, is kept constant.
4. The rendering engine receives the new setting. In response it changes the frustums used in rendering image data and the size of image portions sent to the underlying display are doubled.
5. The software application or other content source receives the new setting. It may for example use this information to include more data in the scene given the higher maximum viewing angle in a scene.

From the above example one can see that a few elements are typical for achieving a flexible system:
A shutter and shutter electronics that can vary effective slit width and sequence of switching. One way to achieve this is to have many very narrow slits that can be switched in groups to create wider effective slit widths.
A flexible image source as underlying display. For example the image source may allow increasing the frame rate by reducing colour or greyscale bit depth. The frame rate may also be increased by reducing flicker rate, animation rate or spatial resolution.

An adaptive rendering solution that may provide image data to the image source based on the chosen display setting.

Additionally one may add a mechanism for varying the distance d, between the shutter and the underlying display.

The user may be given control to change any of the above properties with small or continuous increments. In some situations, it may be desirable to offer a number of presets instead. One example of this could be to have a single user setting and a multiple user setting where a number of properties are changed when switching between the two presets.

Two areas of improving bandwidth will be addressed:

Increasing display bandwidth—this looks at how the bandwidth of the basic 3D display setup can be increased.

Increasing system bandwidth—this looks at how the bandwidth can be increased further and used more efficiently by modifying the basic principle of the display.

Increasing Display Bandwidth

To fully explain the methods for increasing the system bandwidth in the following section it is useful to give a background on the additional restrictions and possibilities that arise from a 3D display compared to a 2D display.

In a 2D display system, such as a cinema projector, a frame is typically an image in a time series of images of a scene. The frame duration is set such that images are updated sufficiently quickly to give smooth animation. In cinema this animation rate is 24 frames per second. However, if an image or any light source is updated at only this animation rate the eye typically perceives flicker. That is why in a cinema projector every frame is shown twice in succession to give an overall refresh rate that is sufficiently high not to give flicker.

In a 3D system each animation frame is made up of a number of subframes, essentially representing different perspectives of the scene. In a time multiplexed system these are shown in a rapid sequence. Hence, the duration of each subframe will be shorter than the overall frame increasing demands on response time. Furthermore, the subframes must be repeated and distributed in a way that does not give rise to any frequency elements that are perceived as flicker. Typically this is solved by running the sequence of the subframes at a rate such that the duration of the full 3D frame exceeds the animation rate. Compared to a 2D display this gives rise to some significant differences:

The duration of which a subframe must display the information is shorter than in a 2D system. This increases demands on response time. In a field sequential colour system it also forces bit durations to be reduced in order to maintain the same bit depth.

Each subframe is repeated at a rate that is typically higher than the minimum animation rate. Unlike in a 2D system this cannot be solved simply by showing the same subframe twice in rapid succession, because one would still have a frequency component at the animation rate. As a result the same subframe is typically repeated at regular intervals.

Reducing Length of Bits

For a time multiplexed image source, such as a DMD, bandwidth is partly determined by the shortest possible duration of the least significant bit (LSB). When a fixed intensity light source is used, subsequent bits are typically power-of-two multiples of the LSB duration. Reducing the LSB duration therefore allows increased bit depth or increased number of frames per second or both.

In some instances one may want to increase the bandwidth to a level where the image source cannot support a sufficiently short LSB. One way to achieve this is to have the image source and the optical shutter synchronised with another device that also modulates the light. There are several options on how to do this:

1. Modulate the intensity of the light before the imaging device
2. Modulate the length of a light pulse before the imaging device
3. Modulate the intensity of the light after the imaging device
4. Modulate the length of a light pulse after the imaging device The above methods can be combined. They can be applied to part of or the entirety of the imaging device. For a self-luminous image device, methods 3 and 4 can be used.

One way to implement 1 or 2 above is to have a light source that is synchronised with the image source. If, for example all the LSBs on the whole image device are placed in the same time window, the light source could be switched off before the end of the LSB, providing a light burst which is shorter than the LSB that the image source can provide, and thereby reducing the intensity of the LSB. The light source could also be dimmed for the duration of the LSB to achieve the reduced intensity. The light source could for example be an LED or an LCD backlight. It could also be a combination of a constant light source and an LED which provides the variation in intensity. Instead of varying the light source one could have a variable filter, e.g. an intensity wheel, between the light source and the imaging device to give the same effect. One could also choose to have different intensities for other bits or groups of bits. In an extreme case the light intensity would be unique for each bit plane.

One could choose to split a subframe into two or more partial subframes. For example all the partial subframes with high order bits could be shown in a group at a higher light intensity and then the partial subframes with lower order bits could be shown in a group with lower light intensity. This way the required speed at which the light source must switch intensity is reduced compared to a case where each subframe is not split. Clearly the shutter sequence must change such that the correct slit opens for each partial subframe.

A variation of the above principle is to have two light sources with different intensity levels. A shutter can be used to switch between the light sources so that they illuminate the imaging device for alternate frames or part of frames.

One way to implement 3 and 4 above is to use a shutter or filter after the imaging device. In a scanning slit system there is already a shutter in place, which could be used for this purpose. If the shutter goes from transparent to blocking light such that the LSB from the imaging device is cut off, the LSB is again reduced. It could also have a grey state which would reduce the intensity of the LSB. The above methods are not restricted to the LSB. It is possible to vary the light intensity for each bit.

The eye is less sensitive to flicker for low light intensities. Therefore it is possible to show less significant bits at lower frequencies than more significant bits. For example, a certain frame rate might require an LSB of shorter duration than the image source can provide. Restricting the LSB to every other frame allows its duration to be doubled, satisfying the image source's minimum LSB duration requirement. This method is not restricted to the LSB and could be extended to more significant bits. The LSB or other bit may be present in fewer than every other frame, i.e. display of the LSB could skip two or more frames.

There is more than one way of implementing the above method. The overall frame duration could be kept constant, such that the frames containing the LSB are the same length as those that do not contain the LSB. In the frames that do not contain the LSB, the time window for the LSB will be replaced with dark time. Alternatively the overall frame duration could vary between frames with the LSB and frames without the LSB. This could be supported by a shutter where each slit can be open for different time periods. For example, if only every other frame contains the LSB the time period for the shutter will vary between t for frames without the LSB and (t+LSB duration) for frames with the LSB.

The method could be implemented through an overlay of an alternating spatial pattern. An example of this would be an alternating checkerboard pattern such that for one frame every other pixel displays the LSB and every other pixel does not display the LSB. In the next frame the checkerboard pattern is inverted and the pixels that in the previous frame displayed the LSB do not display the LSB and vice versa. Overall, in this example every pixel will have the LSB present in every other frame. This method can reduce the overall perception of flicker. Many different patterns can be used where the LSB is on average present in a fraction of every frame.

Increase Grey Scale Bandwidth

At some point the imaging device will not support shrinking the LSB further to gain more bandwidth. In some applications it is desirable to have higher bit depth in grey scale than in colour. For example, a medical x-ray may contain very high bit depth greyscale information, while colour bit depth may not be as important. This can be achieved through a setup that allows switching between a mode where different optical circuits provide different base colours and another mode where different optical circuits provide different white light intensity.

One way to achieve this is to be able to switch between colour filters and static intensity filters. The latter could cover an adjacent but non-overlapping range of intensity values. By way of example: a 15 bit greyscale range can be achieved using three 5-bit greyscale chips by applying 1/32x and 1/1024x intensity filters to two of the chips. Send the top five bits to the unfiltered chip, the middle five bits to the 1/32x chip, and the last five bits to the 1/1024x chip. An alternative way of achieving different intensity levels is to use a single light source and beam splitters. Yet another method is to use different intensity light sources. An example of this would be using an LED light source for lower brightness projector. This would also allow the lower brightness projector to use light modulation as explained above.

Of course, you could also just use two optical circuits to get 10 bits of greyscale, but sticking to three allows the possibility of mechanically switching filters to give a 15 bit RGB system.

An electronic input board can be designed such that it can split an RGB input signal into either different colour signals or into different greyscale bands.

There are several ways of implementing the distribution of the electronic signals to the imaging devices. One method is having a central input board, which distributes the data appropriately to all the available imaging devices and synchronises these. Another method involves multiple input boards that are synchronised, and which in turn distribute the data and synchronise the imaging devices.

Increase Colour Bandwidth

In a similar fashion to using more than one chip to achieve higher greyscale levels, more than 3 optical circuits can be used to increase the bit depth for each base colour. For example, another setup would use 6 or more optical circuits to give 24 bit RGB at 3000 fps, by apportioning 4 bits of the 24 bit value to each projector.

Yet another setup could include a colour wheel for one optical circuit and intensity filters for other optical circuits. Through this method it is possible to have a higher greyscale bit depth than full colour bit depth.

Sharing Time Space between Frames

Figure 1:
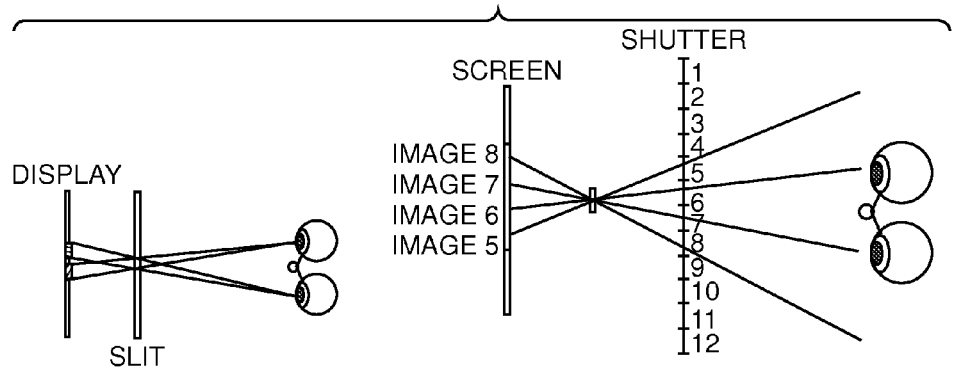
FIG. 1 illustrates a viewer looking at a screen through a slit.
Figure 2:
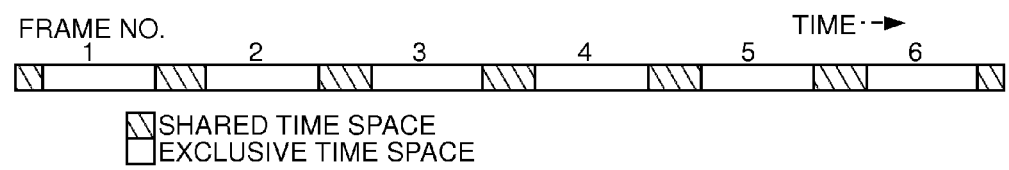
FIG. 2 shows a shared time space between consecutive subframes.

In some instances it is acceptable that two subframes that are adjacent in time share the same time space for lower order bits as shown in FIG. 2. For example this could mean that if one subframe has the LSB set to 0, the next subframe must also have the LSB set to 0. It could also mean that the subframes alternate the use of the time space.

Figure 3:
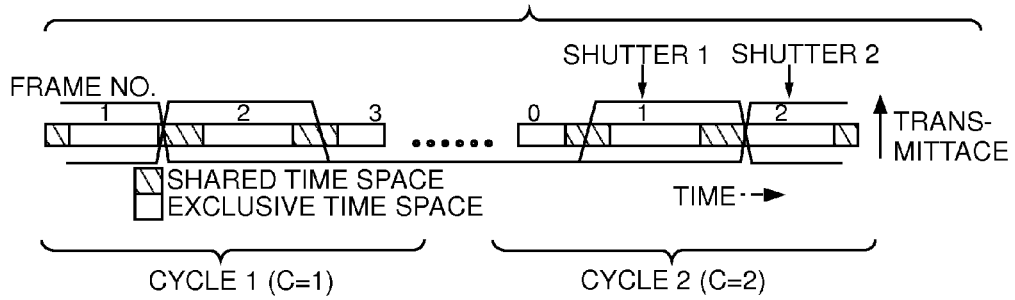
FIG. 3 shows shared time space being used for alternate subframes in consecutive cycles.
Figure 4:
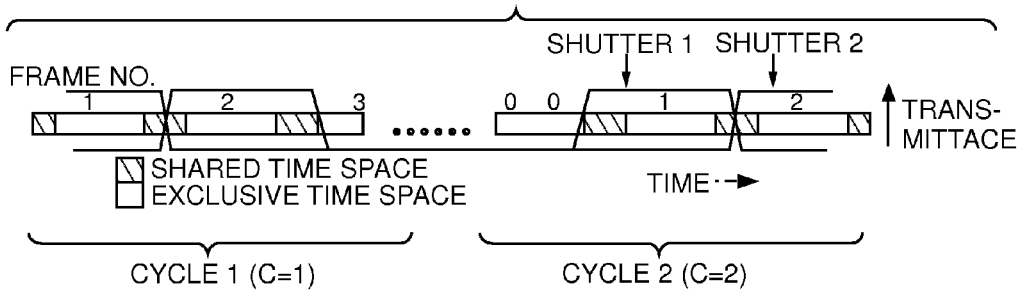
FIG. 4 shows shared time space being equally shared between subframes in consecutive cycles.

By allowing this one could in some instances achieve more effective implementations of some of the principles described above. Implementations of the principle include, but are not restricted to, the following:

1. Alternate use of time space between consecutive subframes. A shutter after the imaging device alternates switching such that in one cycle c=1 the bit or bits in the shared time space belongs to one subframe, e.g. subframe 2, and in the next cycle to the adjacent subframe, e.g. subframe 1. FIG. 3 illustrates how this is used for the shared time space between frame 1 and frame 2.
2. Another example is when the shared time space is the shortest light pulse that the imaging device can support. The shutters can then be used to reduce the pulse further. By sharing the time space it is in some instances possible to increase the subframe display rate. FIG. 4 illustrates how this is implemented between subframe 1 and subframe 2.
3. Another example of shared time space is described below in the section titled "Effective use of bandwidth".

The two above implementations can also be combined by using the shutters to cut off the LSB and then alternating which subframe shows the LSB+1.

Increased System Bandwidth

Filters for Superimposed System

The methods above involve showing only one image on the image plane at any one point in time. In order to increase the bandwidth further one can show multiple images at any one point in time. A general solution could be comprised of a set of images superimposed on the image plane. The shutter would then contain filters which selects only one or a subset of the images for a particular slit or aperture.

Polarization

Figure 5:
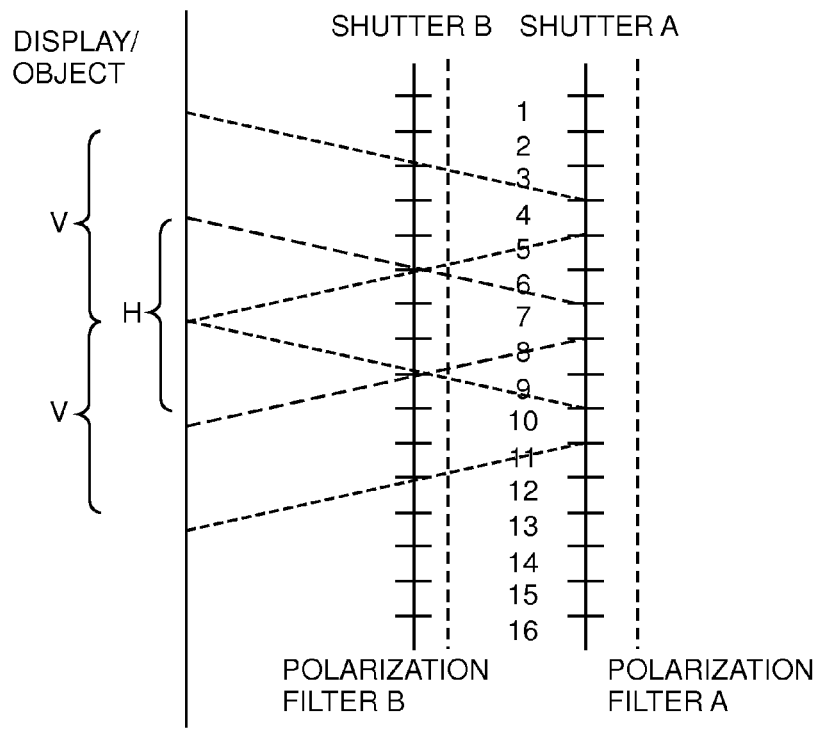
FIG. 5 shows superimposed horizontal and vertical polarization systems.

One example of this is superimposing light with different polarization. Using two projectors, one with vertical and one with horizontal polarization in conjunction with a diffuser that maintains the polarization of the light, one can design the shutter such that these will act as two independent systems that are superimposed in the same space. FIG. 5 shows one example of such a system.

In this example Shutter A and Shutter B represent liquid crystal cells. Consider an area in the centre of the display for a given point in time. In the centre there is a strip from the horizontally oriented projector (H), which is synchronized with the opening of slit 7 on Shutter A. The cone from slit 7 must hence be open for horizontally polarized light only. Slits 5, 6, 8 and 9 should be closed for any polarization. The cones from slits 4 and 10 on the other hand are open for vertically polarized light only. This way, the region H is completely overlapped by the two areas V, which means that two independent images can be projected to give double system bandwidth.

The operation is as follows. Shutter B does not twist the light for slits 6,7 and 8. This means that light from the regions V but not from H are filtered out for these slits by Polarization Filter B. Slits 3, 4, 5 and 9, 10, 11 on the other hand twist the light to filter out light from the region H but not from V. All light is now horizontally polarized. Slits 4, 7 and 10 on Shutter A are set to twist the polarization of the light so that it passes through the vertical filter at the slit. Slits 5, 6, 8 and 9 are set not to twist the polarization so the light is blocked by the vertical filters.

Note that Shutter B does not give dark zones, since all light exits as horizontally polarized. This means that one will see adjacent regions when going outside the maximum viewing angle. A third shutter could be added to block this cross-talk if desired.

Shutter B could be replaced with a static compensation film. The film would have stripes twisting the polarization interlaced with stripes not twisting the polarisation. In this case one could choose to make the stripes one slit wide and put them as close as possible to Shutter A.

With a liquid crystal with symmetric rise and fall time that can be used in both normally white and normally black mode it would be possible to have a single shutter in the above system. It would use alternating polarization filters for each slit.

Colour Filters

A similar approach may be used having multiple projectors in conjunction with complementary RGB light filters. Each projector projects light of a particular Red, Green and Blue frequency. The red frequency, green frequency and blue frequency define a light bundle. Devices for projecting such colour images are known. These projectors may be combined with interference filters in the shutter. Display types other than projectors could be used in a similar fashion.

The projection device splits the radiation spectrum into several partial light bundles $R_1G_1B_1, R_2G_2B_2, \ldots R_NG_NB_N$. Each bundle is modulated by different image modulators, which could be one or more DMDs. The beams are then reunited by a beam integrator and projected onto a diffuser.

The shutter may comprise a switchable aperture array, wherein each aperture has an interference filters such that only one light bundle will be transmitted. For example, stripes 1, N+1, 2N+1 etc would pass light bundle $R_1G_1B_1$, stripes 2, N+2, 2N+2 etc would pass light from bundle $R_2G_2B_2$, and stripes N, 2N, 3N etc would pass light from bundle $R_NG_NB_N$. Each light bundle and its corresponding set of slits will form an independent system, each system superimposed such that they are operated in the same way as a known scanning slit display. Variations of this method may be used in other 3D display system, including static parallax barrier systems.

Combining with Lens System

Figure 6:
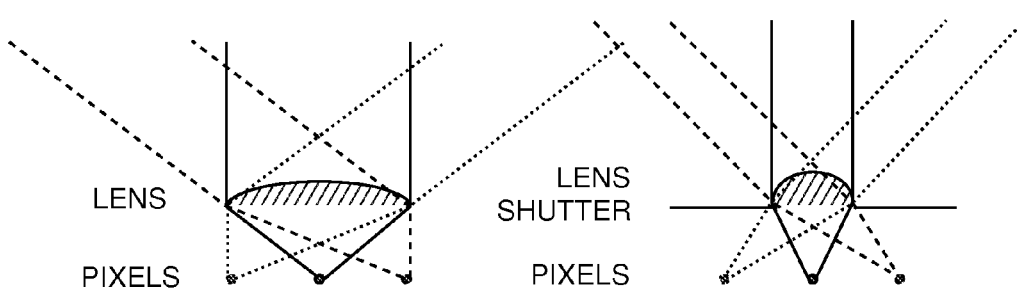
FIG. 6 shows a shutter in combination with a lenticular.

One way to increase bandwidth and brightness for the display without higher frame rate is to combine the technology with similar principles to those used in lenticular displays. An example of this is illustrated in FIG. 6. This would also be an improvement over current lenticular displays, where the main problem is getting a wide field of view and many views without making pixel size or pixel count too challenging.

What is required is a lens or holographic optical element which is placed upon the shutter, just before, just after or both. There will be one lens or optical equivalent for each slit. It acts such that from any point of the display there will be a cone going out to the lens and then the lens will form this into a parallel beam of light the same width as the lens or slit. For horizontal parallax only it should simply act as transparent in the vertical direction. Viewers sufficiently far away from the display will see pixels the width of the lens with a colour that is the combination of light from a section of the display. This is mainly an advantage compared to having no lens if the resolution of the display is higher than the resolution of the shutter. Hence, it is mainly of interest as a way of increasing bandwidth when it is not possible to increase the frame rate further. Also, it would improve the brightness compared to increasing the frame rate.

Combining with Directional Diffuser

One way to increase bandwidth and brightness for the display without higher frame rate is to combine the technology with similar principles to those used in holographic diffuser displays.

Figure 7:
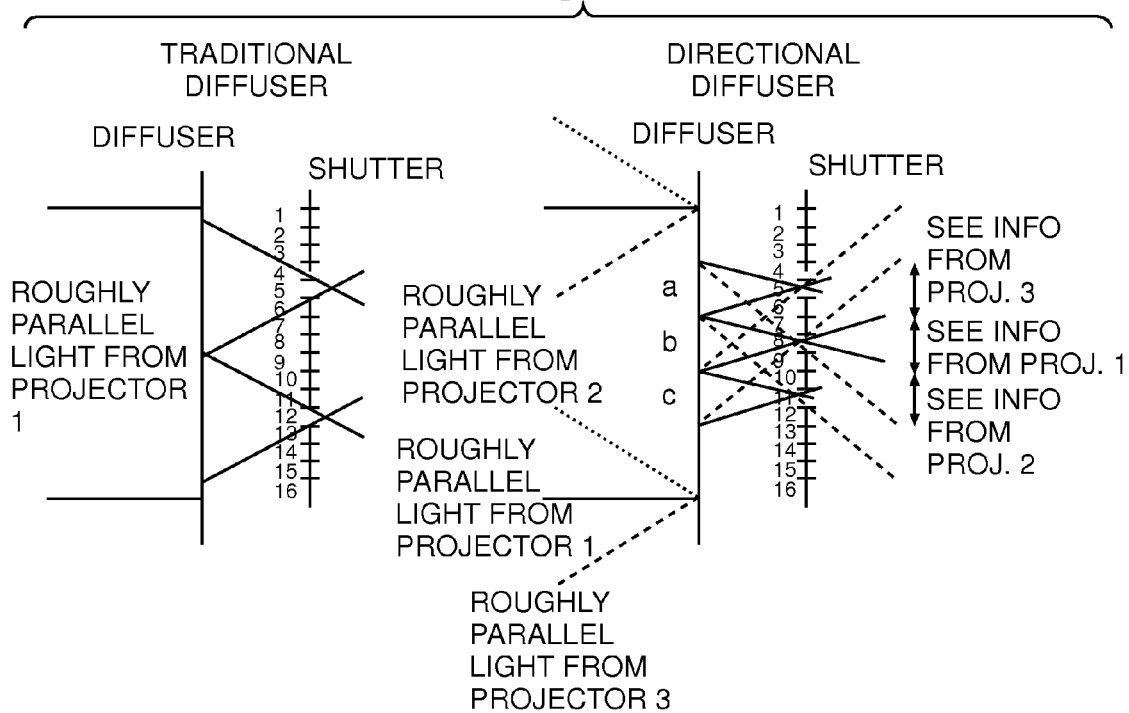
FIG. 7 shows a comparison between an traditional directional diffuser and a directional diffuser.

In effect the directional diffuser, which is sometimes called an asymmetric diffuser, allows three separate images to be superimposed on each other. However, from any one viewing angle or vantage point one should only see a single image. To the left in the FIG. 7 one can see the normal setup for the scanning slit. More or less parallel light comes in and is scattered in all directions by the diffuser. Hence the open slits must be sufficiently spaced apart to avoid cross talk between the images displayed for the respective slits. With the directional diffuser on the right open slits can be put closer together. This is because the cross talk from adjacent areas on the diffuser ends up coming from a different projector. Consider region b. With a normal diffuser this would be synchronized with slit 8 and having slit 5 and 11 open at the same time would give cross talk for large viewing angles. However, if for such viewing angles one would see information from a different projector the cross talk could contain images rendered for slit 5 and 11. These images would not be seen through slit 5 since the angle looking into the diffuser would be different. This setup requires a diffuser that can give a controlled scattering angle and that the light zones from different projectors can be accurately aligned. One way to achieve this is using a holographic optical element.

In some instances it is not desirable to have multiple projectors. For example one might prefer to have a smaller form factor by increasing the bandwidth of a single projector. Time multiplexing will always have an upper limit beyond which other methods must be used to increase bandwidth. For a single projector the next step is then to increase resolution and use this to increase the number of views.

Figure 8:
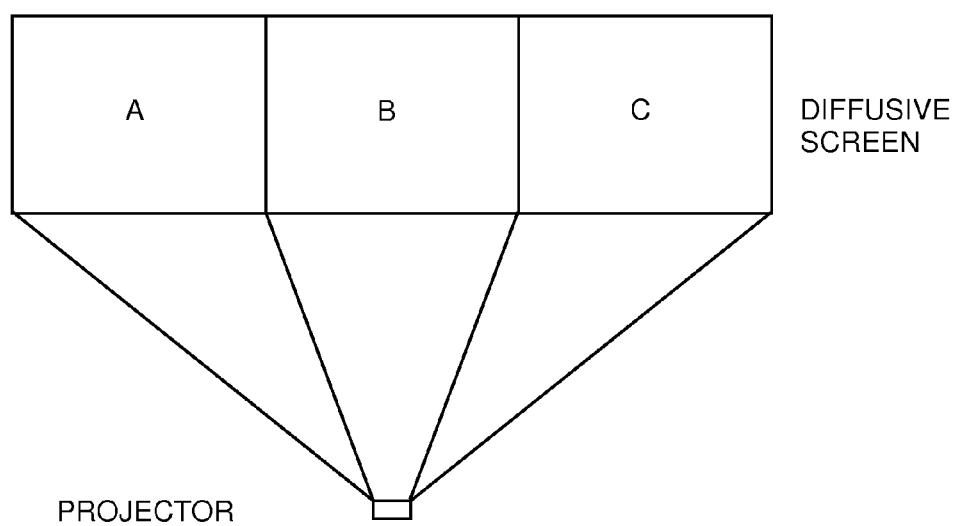
FIG. 8 shows a projector arrangement suitable for use with a directional diffuser.

One option would be to use a wedge with a slightly altered geometry. Consider the wedge in FIG. 8. In this case a projector with very high horizontal resolution could be used to create a wide display.

Figure 9:
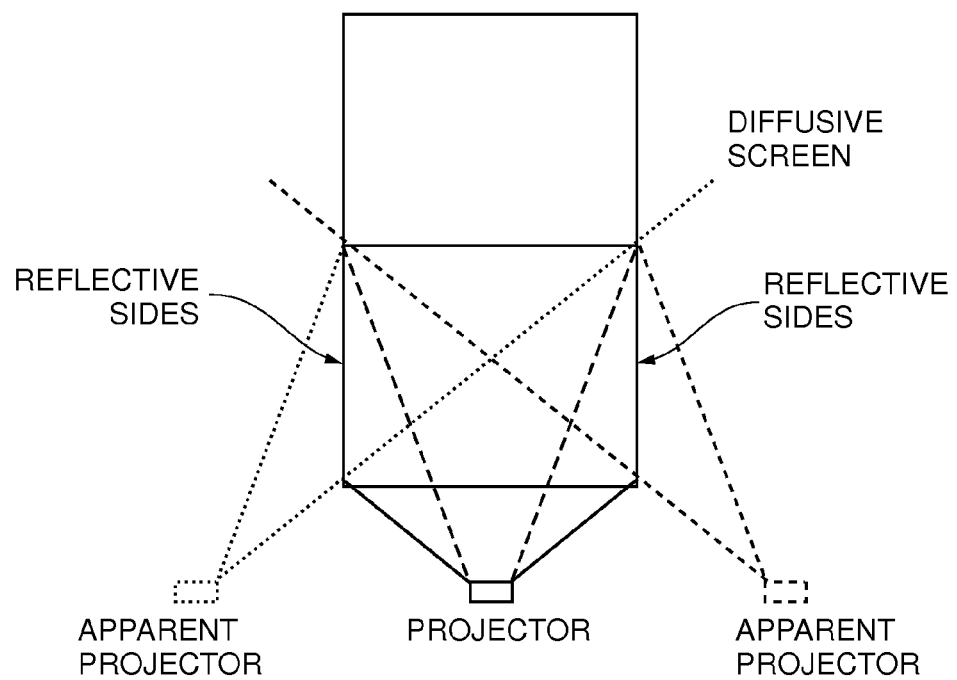
FIG. 9 shows a further arrangement suitable for use with a directional diffuser.

Now, instead of a wide wedge one could allow the light for high viewing angles to reflect back on the central strip as in FIG. 9. This would actually be the equivalent of having three lower resolution projectors projecting from three different positions. The actual projector projecting from straight on (section B above) and two apparent projectors projecting from the sides (sections A and C above). By combining this principle with a directional diffuser one could increase bandwidth using a single high resolution high frame rate projector. This would be similar to having three projectors projecting the image areas A, B and C respectively from the three different projector positions shown in FIG. 9. The directional diffuser will ensure that from any one viewing angle one would only see one of the images A, B or C. A similar effect can be achieved by using mirrors in an optical system not using a wedge. The light path would then be open from the projector to the diffusive screen and mirrors on the side of the light path would create the reflective sides.

Optimising Bandwidth Use Through Head Tracking

The 3D image quality can be improved by directing the same bandwidth to a narrower field of view. One way to do this is to use one or more head tracking devices. Such devices can locate where one or more viewers are located in relation to the display. This information can be used to produce viewing cones centred on the position of each viewer. When the viewers move, the centres of the viewing cones are moved too. The viewing cones can contain more than two views of the scene and be wider than the distance between the observer's eyes. This way the eye tracking system does not need to be as accurate as for existing eye tracking displays.

Eye tracking can also be used to identify which part of a scene the user is focusing on. Because the image quality of the scene varies with distance to the central image plane it can in some situations be desirable to shift the depth plane according to where the user is focusing. Hence, the area in focus can be placed as close to the central image plane as possible. The functionality can be implemented in either hardware or software. One way to implement this depth-of-field effect in software is to accumulate multiple renders of a scene from slightly different perspectives, ensuring that the camera frustums all intersect at the central image plane.

Optimising Bandwidth Use Through Multiple Depths

Figure 10:
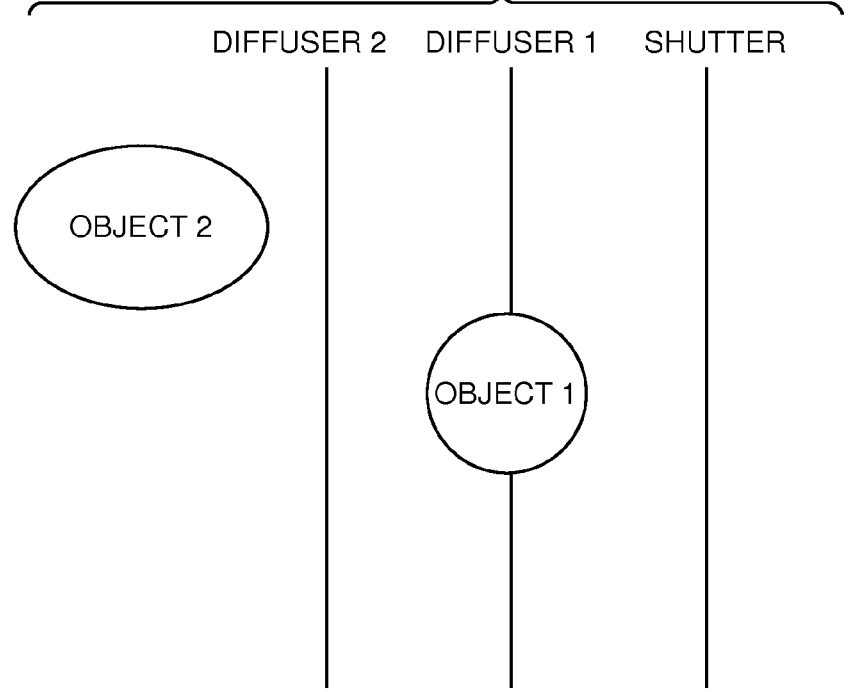
FIG. 10 shows an arrangement comprising two diffusers.

The requirement for high bandwidth is generally more important for scenes that are very deep, i.e. where there are objects spread over a large depth. For example, this could be a problem when there is a background far behind the main scene. One way to improve backgrounds is to have more than one display that shows an image. In FIG. 10, Diffuser 1 would show the main image that is synchronised with the shutter. This will be transparent for light coming from Diffuser 2, and diffusive for light coming from the projector. One way to achieve that effect is to use a holographic optical element. Diffuser 2 will show background information, i.e. objects behind Diffuser 2 such as Object 2 below. Diffuser 1 will show all other information. If one would like to avoid objects to appear as semi-transparent one could synchronise both the image on Diffuser 1 and Diffuser 2 to ensure that for any one viewing angle only one of the Diffusers will show information. One could also place a second shutter behind Diffuser 1. This would have pixels that are transparent when a pixel on Diffuser 1 is supposed to be transparent and black in all other instances. In this case Diffuser 2 could be an image source which is constant for all frames and only needs to be updated at the animation rate of the overall scene.

Effective Use of Bandwidth

Figure 11:
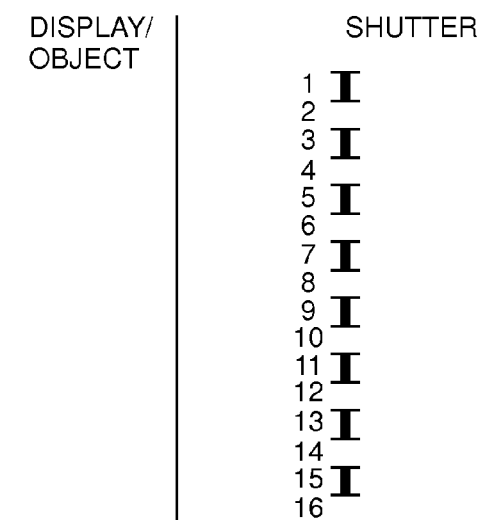
FIG. 11 shows a narrow slit arrangement with odd apertures always closed.

The principle of sharing time space between subframes can be extended even further. The effective resolution of a scanning slit display system decreases with a virtual point's distance from the diffuser/display plane. One remedy is to make slits narrower by introducing black stripes between slits. In FIG. 11 odd slits would always be closed and the even slits would be scanned.

Figure 13:
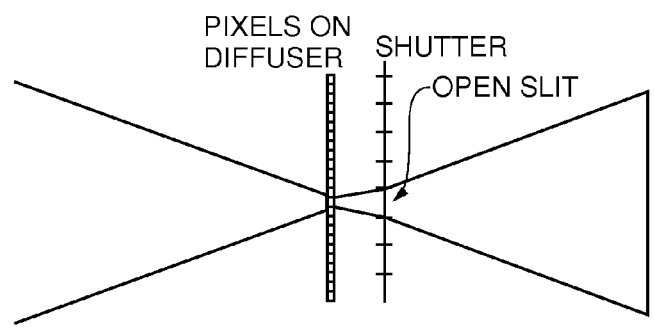
FIG. 13 illustrates a pixel on the screen sweeping a narrower volume of space in the 3D scene, this providing improved resolution.

This could give an acceptable image as it is how static parallax barriers work. It would be dimmer though and the black stripes could be irritating. The gain would be the narrower slits, which would decrease the size of the volume swept by a display pixel shown in FIG. 13.

Figure 12:
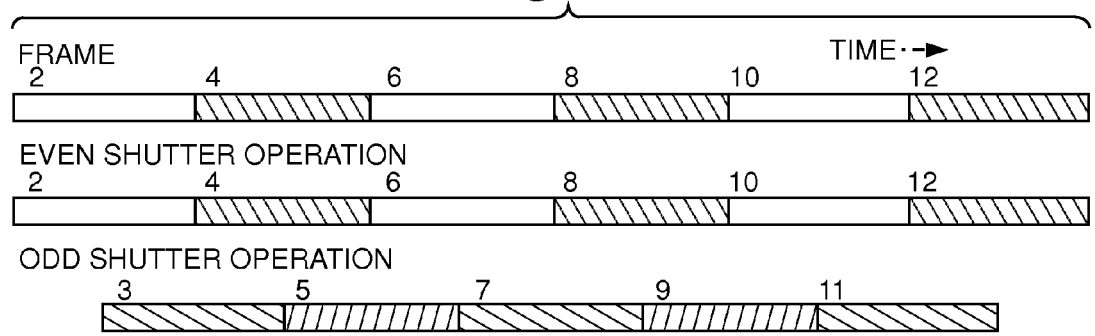
FIG. 12 shows a the operation of the odd numbered slits as average value slits.

Instead of blocking out every odd slit, that slit could show the average value of adjacent slits. For example, slit 9 would show pixel values that are an average between the subframes for slit 8 and 10. That could be achieved by opening the shutter in slit 9 half way into the subframe for slit 8 and close it half way into the subframe for slit 10. See timing diagram in FIG. 12.

Another way of explaining it is that two adjacent slits will always have a period when they are open at the same time.

For points on the display plane, the pixel values will be identical for slits 8 and 10, and as a result for slit 9, assuming there are no lighting effects. Hence brightness has increased and the stripe has been removed compared to the setup in FIG. 11. For points out of the display plane the pixel values on the diffuser will be different between subframes 8 and 10. If one considers the volume swept by the same pixel on the diffuser for slit 8 and 10, one will see that there is a large overlap of these with that of the same pixel for slit 9. As a result, the pixel value for frame 9 would have been highly dependent on the pixel value for slits 8 and 10 even if one could show a unique frame for slit 9. It seems like the number of views have doubled. The compromise is that transitions between adjacent views will be limited. For example, it will not be possible for a pixel on the display to go from full black to full white in one view or slit increment. Instead one may be restricted to go from full black to 50% grey. It should be noted however that this limitation may not cause significant visual degradation of the scene. In order to understand this, consider FIG. 13. It shows a pixel on the diffuser and an open slit in the shutter. The cone represents the area in which a virtual object should influence the state of the pixel on the diffuser for an observer moving freely in front of the diffuser.

Figure 14:
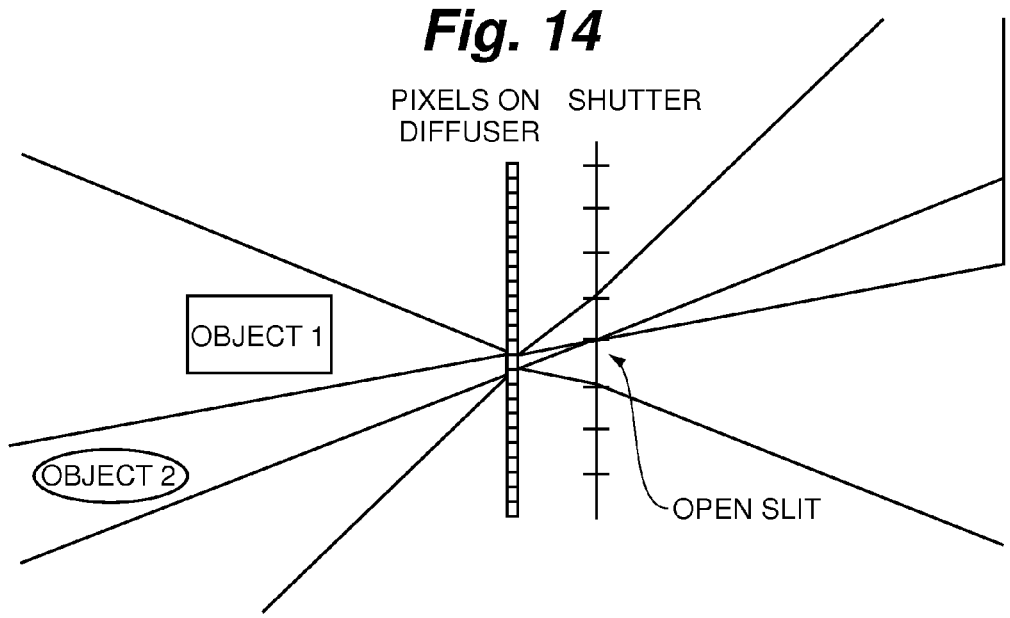
FIG. 14 shows the image cones for a pixel for two adjacent slits.

FIG. 14 represents the cones for the same pixel for two adjacent shutter slits. What becomes clear is that there is considerable overlap between the two areas. For example in the plane of the diffuser the overlap will be total. It should be noted that there is also considerable overlap at other depths as well, though the overlap is not total so the pixel will in many instances have different values for different shutter slits. For example, the virtual Object 1 should only influence the pixel value for the open slit. Object 2 on the other hand should influence the pixel value for both slits examined.

For objects in or near the diffuser plane there will not be large transitions for pixels on the diffuser between adjacent frames (corresponding to adjacent shutter slits). This makes sense since an image in this plane will look the same in all directions. It is not necessary to have a 3D display to show such an image (if one ignores lighting effects). For objects further away from the diffuser they may or may not lead to large transitions in pixel values depending on where they are placed, i.e. Object 1 would lead to a larger transition than Object 2 would, since Object 2 is present in the cones for both slits. This is an inherent restriction in the display system, which is a reflection of the fact that with limited bandwidth it is not possible to make an ideal representation of reality. It should be noted however that for many rendering methods the fact that the two cones above have a large overlap will mean that the transition in pixel values will be restricted. The conclusion is that the transition in the value that the same pixel takes for two adjacent subframes is restricted by the inherent limitations in the system geometry.

In fact, one could allow subframes to overlap even more to give higher brightness or more views. The result would be a higher interdependence, and interdependence not only with the adjacent slits, but also with slits further away.

Figure 15:
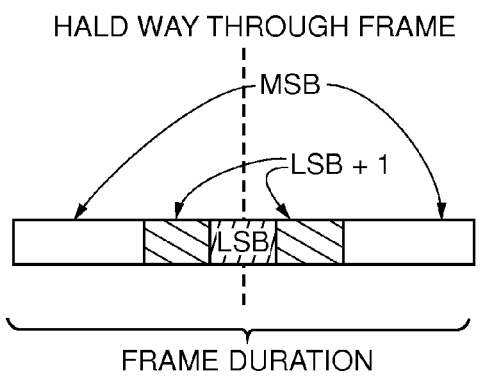
FIG. 15 shows a bit sequence wherein all bits are centred in time about a mid-point of the subframe duration.

The scheme can give a more accurate interpolation by ensuring that the bit sequencing for the time multiplexed display is such that all bits are proportionally represented in each time window where two or more adjacent shutters are open simultaneously. The example in FIG. 15 shows one such bit sequence for a 3 bit frame. The LSB+1 and the MSB are split in two parts on either side of the half way point in the frame. The LSB is not split, but is placed in the centre of the subframe.

A further extension would involve a shutter with pixels or other apertures rather than slits. In this case there could be overlap in time both in the horizontal and vertical direction.

In some instances the system could also be improved by analysing the similarity between subsequent subframes, either locally on different parts of the display or the whole display. The principle would be the same for both whole and partial subframes. The time overlap could then be adapted to the difference between subsequent frames. The order of the subframes could be changed such that the sum of differences between frames is minimised or such that the maximum difference is minimised or the average difference is minimised or some other quantitative measure.

Varying Slit Width within 3D Frame

As mentioned in the previous section, the effective resolution of a scanning slit display system decreases with a virtual point's distance from the diffuser/display plane, and one way to reduce this effect is to reduce shutter slit width. However, the requirement to have thin slits is typically more important for virtual points far away from the diffuser plane than for those close to it. At the same time it may be acceptable to have lower image quality for virtual points far away from the display. To take advantage of this fact one can construct a system that effectively makes up two or more interlaced systems, each with a different slit width.

Figure 19:
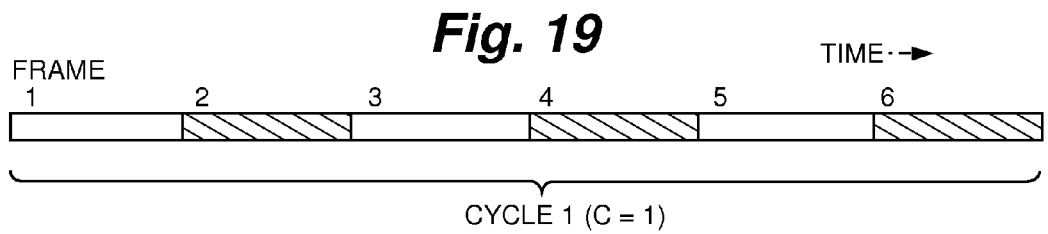
FIG. 19 shows a frame cycle comprising a subframe displayed for each of 6 groups of slits.
Figure 20:
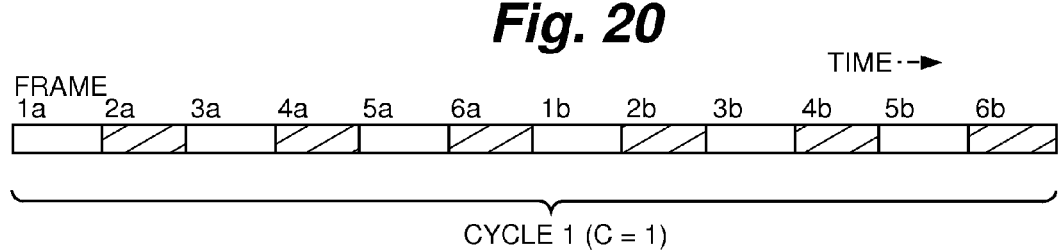
FIG. 20 shows a frame cycle comprising 2 subframes displayed for each of 6 groups of slits.

Consider a basic setup for a simple system consisting of 6 unique frames and 6 slit groups described in FIG. 17. Each subframe is shown within a frame cycle as shown in FIG. 19. The cycle is repeated at a rate that is sufficiently fast for a viewer not to perceive flicker. Because of this fact, the cycle can be changed without causing flicker. For example, the first half of each subframe could be placed at the start of the cycle and the second half at the end of the cycle as illustrated in FIG. 20. This requires that the shutter sequence changes to match the new partial subframes. As an example, the first half of the subframe could contain the MSB and the second half lower order bits.

Figure 21:
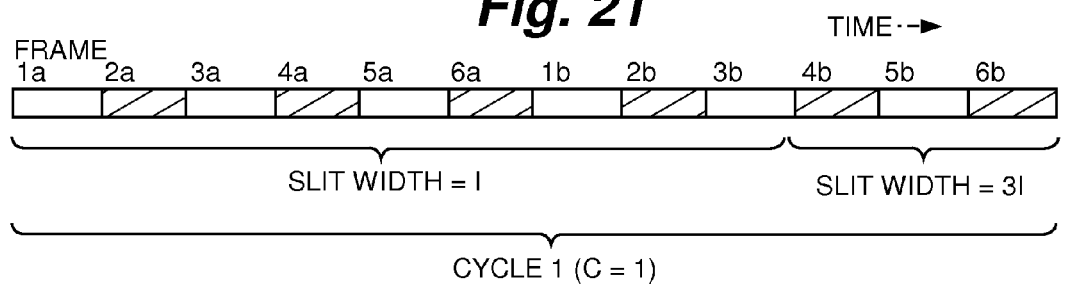
FIG. 21 shows a frame cycle comprising 9 subframes displayed for 9 slit groups having a slit width of 11 and 3 subframes displayed for 3 slit groups having slit widths of 31.

If the shutter sequence is changed further it is possible to have narrower slits for the first sets of subframes than for the second sets of subframes. FIG. 21 shows such an example where the cycle consists of a set of 9 subframes scanned with 9 slit groups, and a second set of 3 subframes scanned with 3 slit groups. In this example, the slit width for the second set of subframes is three times wider than the slit width for the first set of subframes. This way a system with narrow slits and better depth properties has been superimposed with a system of wider slits. Compared to the base example part of the system has narrower slits and part of the system has wider slits. The light reaching the eye from any one pixel will be the same. However, if one had reduced the slit width for the entire system to fit in 9 unique frames, the light output would need to be reduced to maintain the same cycle length.

The above is only an example. The system can be split into any number of subframes and the duration of each subframe can be different. The order of subframes within a cycle can also be changed. The method can be applied even in a system without field sequential colour.

It should also be noted that the slits do not need to be physically wider or narrower. Instead the same effect can be achieved by switching one, two or more groups of slits simultaneously.

In some instances it is advantageous to have the first subframes be multiple of the second set of subframes, such that the information rendered for the first subframes can be used for the second subframes. In the example above the multiple is 3 and as an example partial frames 2, 5 and 7 from the first set of frames could be used as the three subframes for the second set.

An extreme case of the method is to add a single subframe within the cycle where the full shutter is transparent and a frame or subframe displayed.

In some instances the method can be improved by only showing data for parts of the virtual scene for a particular set of subframes, and showing another part or the whole virtual scene for another set of subframes.

The slit width can also be made to vary along the width of the display. Depending on the scene one may wish to prioritize different areas. For example, in scenes where the focus tends to be on objects at the centre of the display the slits could be narrower at the centre of the display than at the sides. The zone with narrower slits could also be made to move dynamically. By using eye tracking or another user device to change the zone, one can ensure that slits are narrower in the part of the display where the user is focusing.

Embodiments of the present invention have been described with particular reference to the examples illustrated. However, it will be appreciated that variations and modifications may be made to the examples described without departing from the scope of the present invention.

The invention claimed is:

1. A method of operating an autostereoscopic display, the autostereoscopic display comprising a switchable aperture array and a screen, the method comprising:
displaying a portion of an image on the screen for a first display time period;
using the switchable aperture array located between a viewer and the screen to restrict to a second visibility time period a time for which the portion of the image displayed on the screen is wholly or partly visible to the viewer;
wherein the second visibility time period is less than the first display time period, and
varying the second visibility time period to define greyscale levels of image brightness presented to the viewer.

2. The method as claimed in claim 1, wherein the first display time period is a minimum time period for display of a pixel on the screen.

3. The method as claimed in claim 1 wherein the screen is time multiplexed using a light source of constant intensity.

4. The method as claimed in claim 2 wherein the screen is time multiplexed using a light source of constant intensity.

5. The method as claimed in claim 1, wherein the portion of the image comprises a group of pixels and the image elements of each pixel are arranged to be displayed in the same order for all pixels in a group such that the aperture restricts the same image elements for all pixels in the group.

6. The method as claimed in claim 2, wherein the image elements of each pixel in a group are arranged to be displayed in the same order.

7. The method as claimed in claim 3, wherein the image elements of each pixel in the group are arranged to be displayed in the same order.

8. The method as claimed in claim 2, wherein the image elements of each pixel in the group are arranged to be displayed with the same timing.

9. The method as claimed in claim 3, wherein the image elements of each pixel in the group are arranged to be displayed with the same timing.

10. The method as claimed in claim 4, wherein the image elements of each pixel in the group are arranged to be displayed with the same timing.

11. The method as claimed in any of claims 3, wherein the image elements are bits.

12. The method as claimed in claim 1, wherein the second visibility time period is varied in discrete amounts to define the greyscale levels of image brightness.

13. The method as claimed in claim 1, wherein the screen has a minimum display time for an LSB, and the switchable aperture array reduces the amount of time that the LSB is visible.

14. The method as claimed in claim 1, wherein the screen has a minimum display time for an LSB, and the switchable aperture array reduces the visible average intensity of the LSB.

15. An autostereoscopic display apparatus comprising a switchable aperture array and a screen, the autostereoscopic display apparatus arranged to:
- display a portion of an image on the screen for a first display time period;
- use the switchable aperture array located between a viewer and the screen to restrict to a second visibility time period a time for which the portion of the image displayed on the screen is wholly or partly visible to the viewer, wherein the second visibility time period is less than the first display time period; and
- vary the length of the second visibility time period to define greyscale levels of image brightness presented to the viewer.

* * * * *